United States Patent [19]
Hashimoto et al.

[11] Patent Number: 5,856,902
[45] Date of Patent: Jan. 5, 1999

[54] EARTH LEAKAGE BREAKER

[75] Inventors: Takashi Hashimoto; Kiyoshi Tanigawa; Shoji Sasaki; Katsumi Watanabe, all of Tochigi, Japan

[73] Assignee: Fuji Electric Co., Ltd., Kawasaki, Japan

[21] Appl. No.: 889,861

[22] Filed: Jul. 8, 1997

[30]       Foreign Application Priority Data

Jul. 9, 1996  [JP]  Japan .................................... 8-198363

[51] Int. Cl.⁶ ...................................................... H02H 3/00
[52] U.S. Cl. ................................................. 361/42; 361/57
[58] Field of Search ................................ 361/42–50, 54, 361/55, 57; 324/535, 541, 551; 340/650, 651, 644

[56]                References Cited

U.S. PATENT DOCUMENTS 5,600,523   2/1997   Park .......................................... 361/42

*Primary Examiner*—Ronald W. Leja
*Attorney, Agent, or Firm*—Kanesaka & Takeuchi

[57]                ABSTRACT

The earth leakage breaker of the invention includes a first comparator; a second comparator connected to the first comparator; a third comparator having a threshold higher than the threshold of the first comparator for distinguishing a leakage current from the grounding current caused by a lightning surge or by the heavy ground fault; a monostable multivibrator triggered by the output of the third comparator for forming a time gate of a predetermined period; a counter for detecting a pulse outputted from the first comparator to distinguish whether the grounding current is caused by the lightning surge or by the heavy ground fault; and a trip signal generator circuit for outputting a trip signal in the case of leakage and heavy ground fault. The earth leakage breaker facilitates avoiding unnecessary breaking of the impulsive grounding current caused by the lightning surge.

9 Claims, 17 Drawing Sheets

EARTH LEAKAGE BREAKER

BACKGROUND OF THE INVENTION AND RELATED ART STATEMENT

The present invention relates to an earth leakage breaker. More specifically, the present invention relates to an earth leakage breaker that facilitates avoiding unnecessary break caused by lightning surge.

FIG. 16 is a block diagram of a conventional earth leakage breaker. FIG. 17 is a time chart of the outputs from the constituent devices of the conventional earth leakage breaker of FIG. 16. Referring now to FIGS. 16 and 17, a secondary current is generated in a secondary winding of a zero-phase current transformer 3 (hereinafter referred to as a "ZCT") wound around main circuit conductors 2 of an earth leakage breaker 1 when a leakage current or a grounding current caused by lightning surge flows in the main circuit conductors 2. The secondary current is converted to a voltage signal by a resistor 4. The voltage signal is amplified by an amplifier 6 after impulsive noise or high frequency leakage current components on the secondary side of an inverter are removed from the voltage signal by a low-pass filter 5. The output of the amplifier 6 is resolved to positive and negative pulses by the threshold of a first comparator 7. The positive and negative pulses are synthesized in an OR circuit (OR1). The output of the first comparator 7 through the OR circuit (OR1) is integrated in an integrator circuit 8. When the output of the integrator circuit 8 exceeds the threshold of a second comparator 9, a trip-signal generator circuit 10 feeds a trip signal γ to a trip coil 11 based on the output α of the second comparator 9 to trip the earth leakage breaker 1.

The breaking period of the high-speed earth leakage breaker is specified to be within 40 ms by the IEC specification for protecting the human body. Since it usually takes about 23 ms at the maximum for the earth leakage breaker to operate mechanically, 40−23=17 ms is left for the judging period until feeding the trip signal to the trip coil. If the period during which the output of the amplifier 6 exceeds the threshold of the first comparator 7 described in FIG. 17, i.e. the pulse width of the output of the first comparator 7, is set at 7 ms and the pulse interval at 3 ms, the total pulse width necessary to output the trip signal γ within the foregoing 17 sec., i.e. the integration period of the integrator circuit 8, will be 17−3=14 ms.

In the case of the grounding current due to the lightning surge that is not to be broken, if the period during which the output of the amplifier 6 exceeds the threshold of the first comparator 7 is 5 ms for the positive signal and 20 ms for the negative signal, the total is 25 ms, which exceeds foregoing 14 ms.

Therefore, when the pulse interval is set at 2 ms, trip signal γ will be outputted within 16 ms and the unnecessary break will be caused.

In view of the foregoing, it is an object of the invention to provide an earth leakage breaker that exhibits improved performances.

It is another object of the invention to provide an earth leakage breaker that does not cause any unnecessary break due to the lightning surge.

It is a further object of the invention to provide an earth leakage breaker that securely breaks the periodical short-circuit current, i.e. heavy-grounding current, as well as the usual leakage current.

SUMMARY OF THE INVENTION

According to an aspect of the invention, there is provided an earth leakage breaker that includes a zero-phase current transformer through which main circuit conductors are inserted, and first and second detecting means for detecting a leakage current and a grounding current caused by heavy ground fault or by lightning surge. The first detecting means includes a first comparator that detects an output of the zero-phase current transformer exceeding a first detection level, an integrator that integrates the output of the first comparator, and a second comparator that detects the output of the integrator exceeding a second detection level and outputs a first signal. The second detecting means is connected parallel to the first detecting means, and includes a third detection level higher than the first detection level. The second detecting means detects the secondary output of the zero-phase transformer repeatedly exceeding the third detection level to output a second signal indicative of the leakage current or the grounding current caused by heavy ground fault. The breaker includes a trip signal generator that outputs a trip signal to a trip coil in response to the first signal and the second signal.

Advantageously, the second detecting means includes a third comparator that detects the secondary output of the zero-phase current transformer higher than the third detection level; a monostable multivibrator triggered by the output of the third comparator to operate for a predetermined operating period; a counter that counts pulses outputted from the first comparator for the predetermined operating period of the monostable multivibrator and outputs a counting signal indicating that the counter has counted a predetermined number of pulses; an OR gate to which the counting signal and an inverted output from the monostable multivibrator are. connected; and a first AND gate that feeds an AND output of the second signal from the OR gate and the first signal from the second comparator to the trip signal generator.

When the monostable multivibrator is triggered to operate by the lightning surge, the inverted output of the monostable multivibrator is "L". However, since the counting signal, i.e. the second signal, is not generated by the impulsive lightning surge, an AND condition of the counting signal from the counter and the first signal from the second comparator does not occur. Therefore, the trip signal is not outputted. When the repetitive continuous heavy ground fault is caused, the counter counts pulses more than the predetermined number, so that the trip signal is outputted in response to the counting signal from the counter. Since the monostable multivibrator is not triggered to operate by the usual leakage, the AND condition of the inverted output from the monostable multivibrator and the first signal from the second comparator occurs and the trip signal is outputted.

Advantageously, the second detecting means may include a third comparator that detects the secondary output of the zero-phase current transformer higher than the third detection level; a monostable multivibrator triggered by the output of the third comparator to operate for a predetermined operating period; a counter that counts pulses outputted from the first comparator for the predetermined operating period of the monostable multivibrator and outputs a counting signal indicating that the counter has counted a predetermined number of pulses; and an RS flip-flop having a reset terminal to which an OR output of the counting signal and an inverted output of the first signal from the second comparator is inputted, and a set terminal to which an AND output of the output from the monostable multivibrator and the first signal from the second comparator is inputted. A first AND gate feeds an AND output of an inverted output, as the second signal from the RS flip-flop, and the first signal from the second comparator to the trip signal generator.

When the lightning surge is caused, the RS flip-flop is set by the AND output of the output from the monostable multivibrator and the first signal from the second comparator. And, the output of the trip signal is inhibited, since the AND condition of the inverted output, i.e. the second signal, from the RS flip-flop and the first signal from the second comparator does not hold or occur. When the heavy ground fault is caused, the RS flip-flop is reset by the counting signal from the counter that counts the output pulses from the first comparator. By making the AND condition of the second signal from the RS flip-flop and the first signal from the second comparator, the trip signal is outputted.

Advantageously, the second detecting means may include a third comparator that detects the secondary output of the zero-phase current transformer higher than the third detection level; a monostable multivibrator triggered by the output of the third comparator to operate for a predetermined operating period; and a charge-up-condition change-over circuit that changes over the charge-up condition of the integrator to prolong the integration period of the integrator for the predetermined operating period of the monostable multivibrator.

When the impulsive lightning surge is caused, the second comparator is prevented from outputting the first signal to the trip signal generator by terminating the output of the first comparator before the integrator output reaches the threshold of the second comparator. Although it takes longer for the integrator to integrate in the case of the heavy ground fault, in which the first comparator outputs pulses repeatedly and continuously, than in the case of the usual leakage, the output of the integrator can reach the threshold of the second comparator. At the instance when the output of the integrator reaches the threshold of the second comparator, the trip signal generator is driven by the first signal from the second comparator.

According to another aspect of the invention, there is provided an earth leakage breaker that includes a zero-phase current transformer through which main circuit conductors are inserted, and first and second detecting means for detecting a leakage current and a grounding current caused by heavy ground fault or by lightning surge. The first detecting means includes a first comparator that detects the secondary output of the zero-phase current transformer exceeding a first detection level, an integrator that integrates the output of the first comparator, and a second comparator that detects the output of the integrator exceeding a second detection level and outputs a first signal. The second detecting means is connected parallel to the first detecting means. The second detecting means detects a predetermined number of pulses outputted from the first comparator in a period based on the first signal from the second comparator to output a second signal indicative of the leakage current or the grounding current caused by heavy ground fault. A trip signal generator outputs a trip signal to a trip coil in response to the first signal and the second signal.

Advantageously, the second detecting means includes a monostable multivibrator triggered to operate by the first signal from the second comparator; and a second AND gate to which the output of the monostable multivibrator and the output of the first comparator are connected, the output of the second AND gate being the second signal. A first AND gate feeds an AND output of the second signal from the second AND gate and the first signal from the second comparator to the trip signal generator.

When the impulsive lightning surge is caused, the AND condition of the output of the first comparator and the output of the monostable multivibrator does not hold or occur, since the output of the first comparator is not generated within the predetermined gate time of the monostable multivibrator after the first signal is generated from the second comparator. In the case of the usual leakage and the heavy ground fault, the AND condition of the output of the first comparator and the output of the monostable multivibrator occurs, since the output of the first comparator is generated after the monostable multivibrator is triggered to operate.

Advantageously, the second detecting means may include a monostable multivibrator triggered to operate by the first signal from the second comparator for a predetermined operating period; a polarity judging circuit that judges alternating input of positive and negative pulses from the first comparator for the predetermined operating period of the monostable multivibrator; and a second AND gate to which the output of the polarity judging circuit and the output of the monostable multivibrator are connected, the output of the second AND gate being the second signal. A first AND gate feeds an AND output of the second signal from the second AND gate and the first signal from the second comparator to the trip signal generator.

When the impulsive lightning surge is caused, the AND condition of the output of the polarity judging circuit and the output of the monostable multivibrator does not hold or occur, since any output with a polarity opposite to the polarity of the earlier output is not generated from the first comparator within the predetermined gate time of the monostable multivibrator after the first signal is generated from the second comparator.

When the usual leakage or the heavy ground fault is caused, the AND condition of the output of the polarity judging circuit and the output of the monostable multivibrator occurs, since the output of opposite polarity is generated from the first comparator after the monostable multivibrator is triggered to operate. The AND output from the AND gate, to which the polarity judging circuit and the monostable multivibrator are connected, and the first signal from the second comparator, is connected to the trip signal generator such that the trip signal is not outputted from the trip signal generator when the lightning surge is caused.

Advantageously, the second detecting means may include a fourth comparator that detects the output of the integrator smaller than the output of the integrator detectable by the second comparator; a counter triggered by the output of the fourth comparator to count a predetermined number of pulses outputted from the first comparator, the counter outputting a counting signal, as the second signal, indicating that the counter has counted the predetermined number of pulses. A first AND gate feeds an AND output of the second signal from the counter and the first signal from the second comparator to the trip signal generator.

The AND condition of the counting signal, i.e. the second signal, from the counter and the first signal from the second comparator holds or occurs when the repetitive and continuous leakage current or heavy-grounding current is caused, since the counting signal is generated from the counter. In contrast, the AND condition of the second signal from the counter and the first signal from the second comparator does not hold or occur when the impulsive lightning surge is caused, since the counting signal is not generated from the counter. Therefore, the trip signal is not outputted in the case of the lightning surge.

DETAILED DESCRIPTION OF PREFERRED EMBODIMENTS

Figure 1:
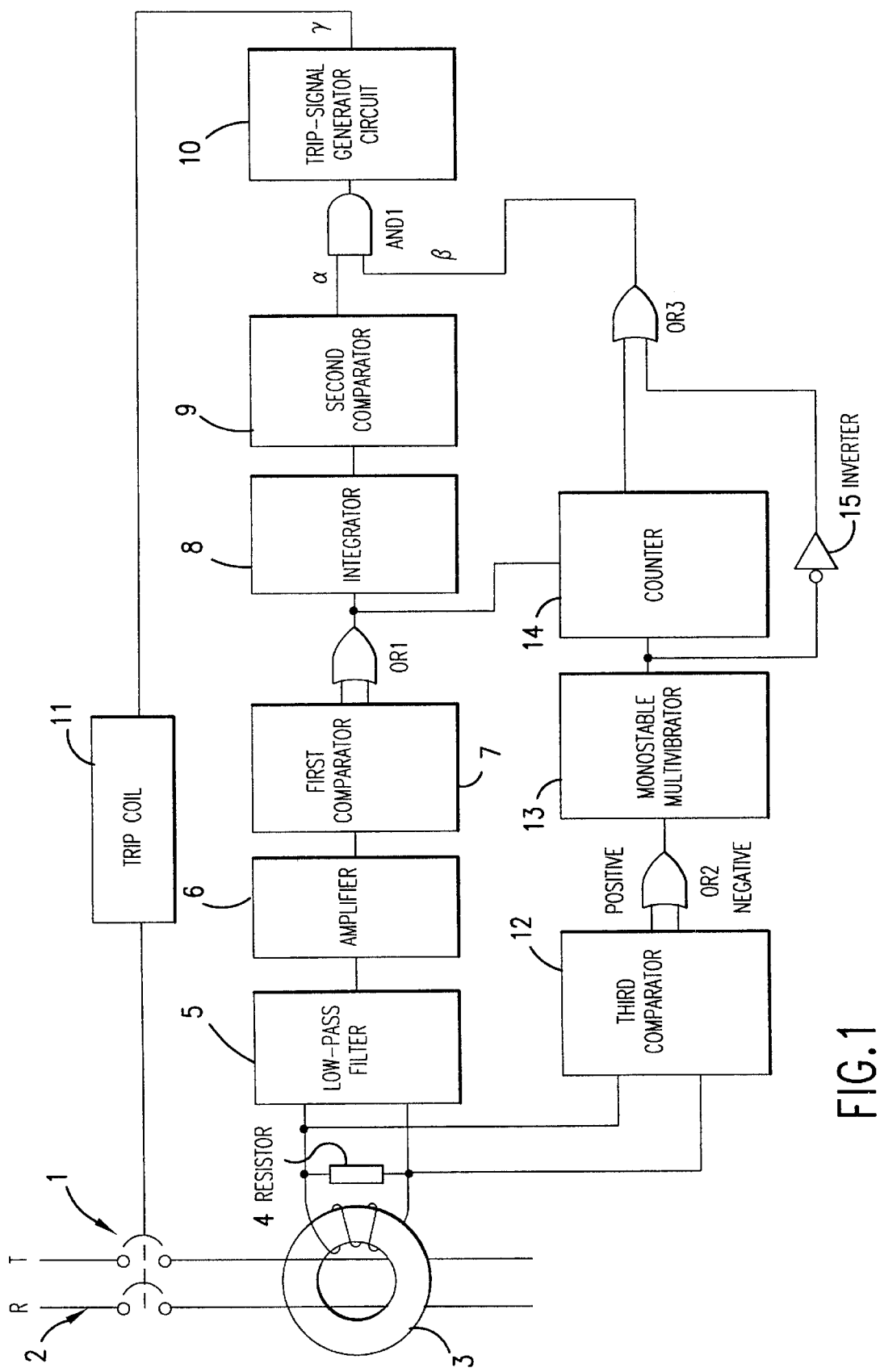
FIG. 1 is a block diagram of a first embodiment of an earth leakage breaker according to the invention.

Now the present invention will be explained hereinafter with reference to the accompanied drawings which illustrate the preferred embodiments of the invention. In the following drawings, constituent devices similar to those of the conventional earth leakage breaker are designated by the same reference numerals.

Figure 2:
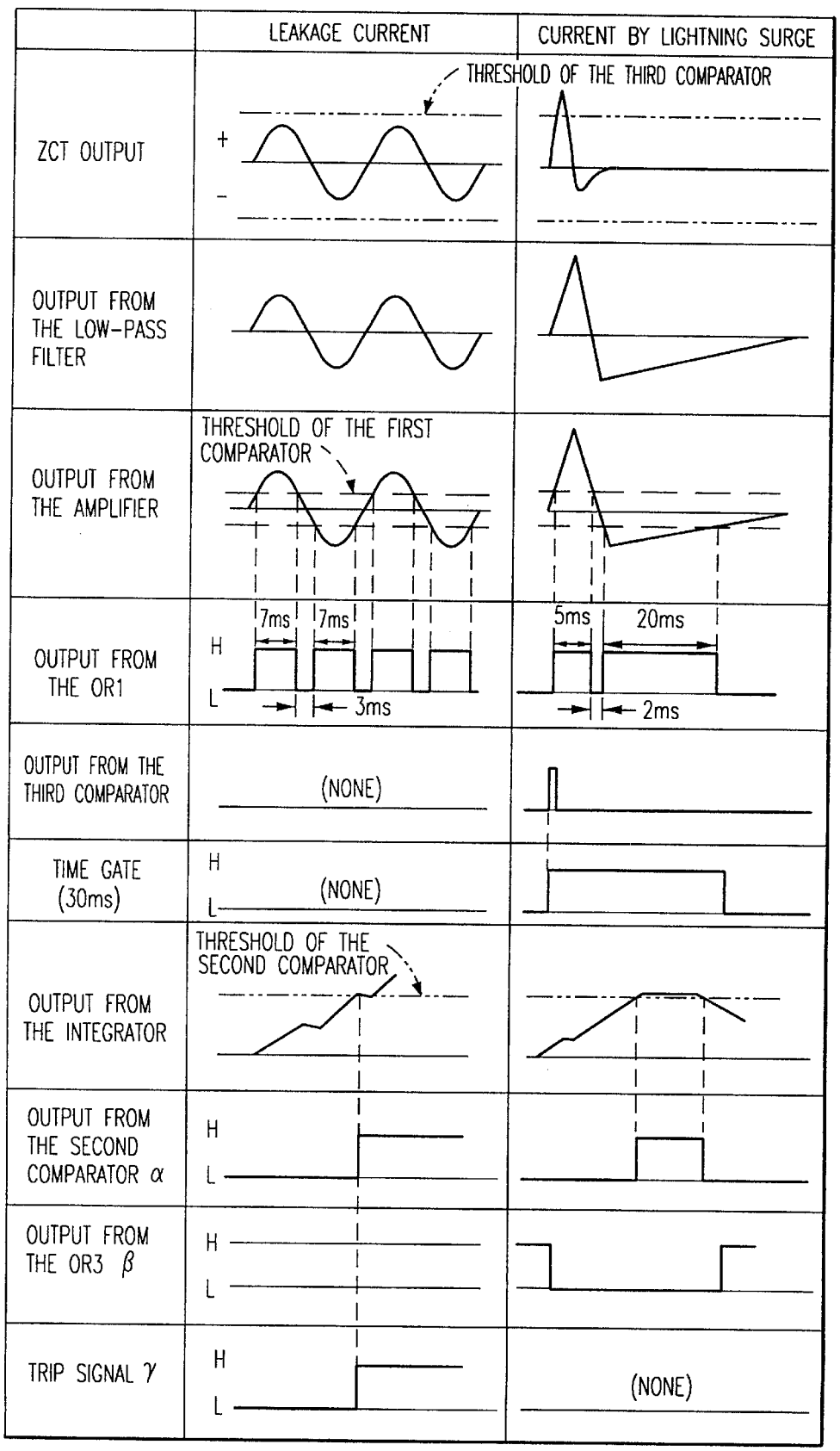
FIG. 2 is a time chart of the outputs from the constituent devices of the earth leakage breaker of FIG. 1.
Figure 3:
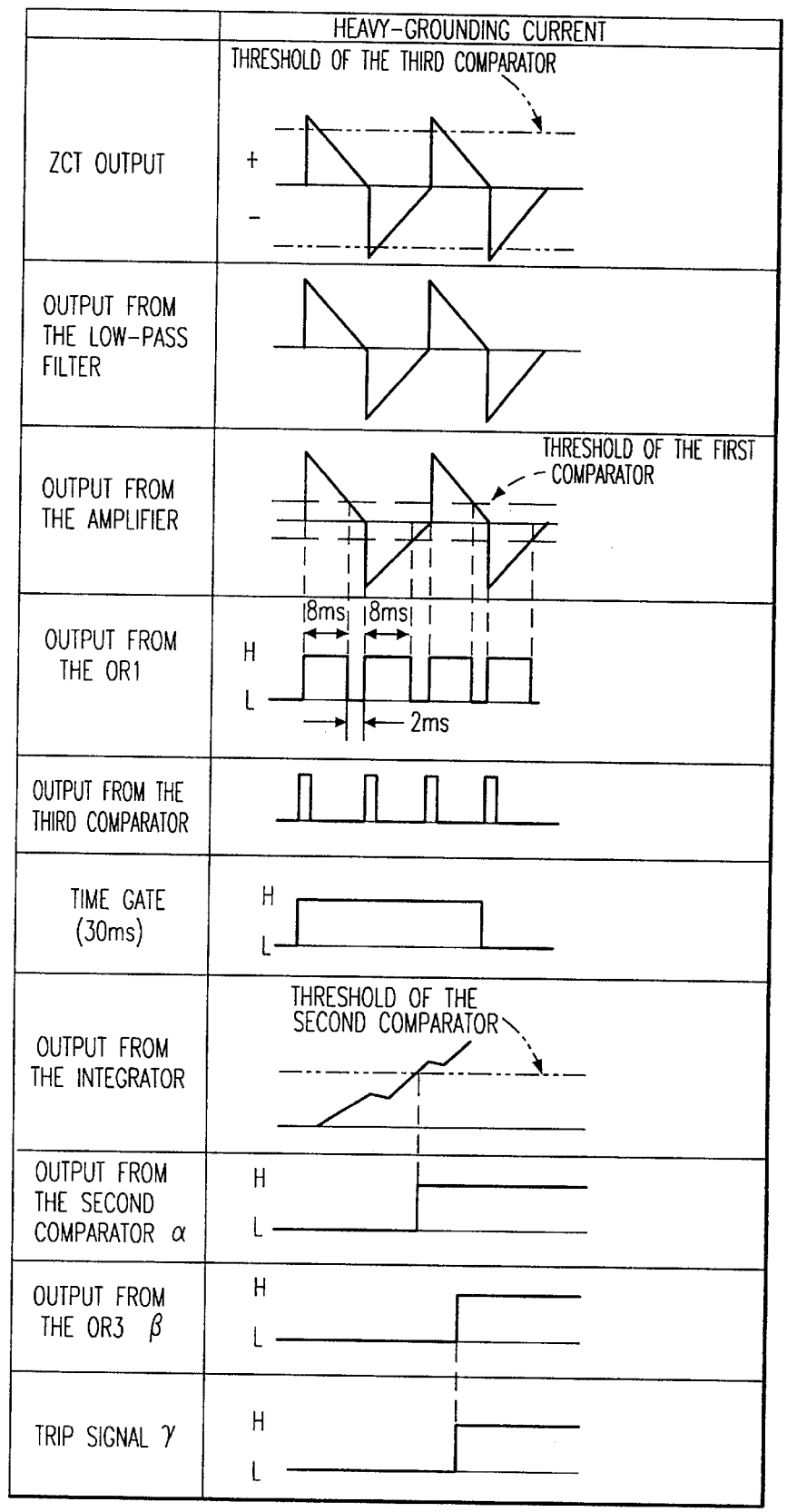
FIG. 3 is another time chart of the outputs from the constituent devices of the earth leakage breaker of FIG. 1.

FIG. 1 is a block diagram of a first embodiment of an earth leakage breaker according to the invention. FIG. 2 is a time chart of the outputs from the constituent devices of the earth leakage breaker of FIG. 1. FIG. 3 is another time chart of the outputs from the constituent devices of the earth leakage breaker of FIG. 1.

Referring now to FIGS. 1 and 2, a secondary current is generated in a secondary winding of a ZCT 3 wound around main conductors 2 when a leakage current of, e.g., 15 mA, flows in the main conductors 2. The secondary current is converted to a voltage signal by a resistor 4. The voltage signal is amplified by an amplifier 6 after the voltage signal passes a low-pass filter 5. The output of the amplifier 6 is resolved, e.g. at the commercial frequency of 50 Hz, to the positive and negative pulses of 7 ms in the pulse width and 3 ms in the pulse interval by the threshold of the first comparator 7 (1st detection level) set for converting the voltage signal corresponding to the foregoing 15 mA to the pulse signal. The positive and negative pulses are synthesized in an OR circuit (OR1). An integrator circuit 8 is charged up with the output of the OR circuit (OR1), wherein the charge-up time constant of the integrator circuit 8 is set such that the total pulse width of, e.g., 14 ms or more, will exceed the threshold of the second comparator 9 (2nd detection level), and the output α of the second comparator 9 is set to be "H".

A third comparator 12 is connected to both ends of the resistor 4. The threshold of the third comparator 12 (3rd detection level) is set to be higher than the threshold of the first comparator 7 to detect the higher secondary output of the ZCT 3. The third comparator 12 detects the current of, e.g. 1A or more, flowing through the main circuit conductors 2 and resolves the voltage signal corresponding to the detected current to positive and negative pulses. The positive and negative pulses are synthesized in a second OR circuit (OR2). A monostable multivibrator 13 triggered by the output of the circuit OR2 is disposed to form a time gate of, e.g. 30 ms. A counter 14 is disposed to count the pulses outputted from the first comparator 7 for the output period of the monostable multivibrator 13 and to output a counting signal as the counter has counted three pulses. Hereinafter, the counter 14 will be referred to as the "three-pulses counter". The output of the three-pulses counter 14 and the inverted output of the monostable multivibrator 13 inverted in an inverter 15 are inputted to a third OR circuit (OR3). The output β of the circuit OR3 and the output a of the second comparator 9 are inputted to an AND circuit (AND1) and the output of the circuit AND1 is fed to a trip-signal generator circuit 10.

When a leakage current of the foregoing 15 mA flows in the main circuit conductors 2, the output of the monostable multivibrator 13 is "L" and the inverted output is "H", since the third comparator 12 does not detect the leakage current and the monostable multivibrator 13 has not been triggered to operate. The L output and the inverted H output of the monostable multivibrator 13 are inputted to the third OR circuit OR3. As a result, the signals a and B, both "H", are inputted to the circuit AND1. The trip signal γ is fed from the trip-signal generator circuit 10 to a trip coil 11.

In case a grounding current caused by the lightning surge flows in the main circuit conductors 2, when the total width of the pulses, which are formed by comparing the grounding current with the threshold of the first comparator 7, is 25 ms as illustrated in FIG. 2, the output α of the second comparator 9 is "H", since the total pulse width exceeds the foregoing integration period of 14 ms during which the output of the integrator circuit 8 exceeds the threshold of the second comparator 9. And, since a secondary ZCT current of 1A or more in the leakage current conversion is caused, the output of the third comparator 12 is "H". Therefore, the "H" output of the OR2 triggers the monostable multivibrator 13 to open the time gate of 30 ms for which the three-pulses counter 14 counts the output pulses from the first comparator 7. However, the output of the three-pulses counter 14 stays at "L", since only two pulses are inputted to the three-pulses counter 14 as described in FIG. 2. The inverted output of the monostable multivibrator 13 is also "L". Therefore, the output β of the OR3 is "L". Finally, the output of the AND1 becomes "L", and the trip signal γ is not outputted.

Referring also to FIG. 3, when a heavy-grounding current is caused in the main circuit conductors 2, the output of the integrator circuit 8 exceeds the threshold of the second comparator 9, since the total width of the pulses, formed by comparing the heavy-grounding current with the threshold of the comparator 7, exceeds the foregoing 14ms. As a result, the output α of the second comparator 9 becomes "H". Since the secondary ZCT current of 1A or more in the leakage current conversion is caused, the output of the third comparator 12 becomes "H". The "H" output of the third comparator 12 triggers the monostable multivibrator 13. During the output period of the monostable multivibrator 13, the three-pulses counter 14 counts the output pulses from the first comparator 7. At the instance when the three-pulses counter 14 counts the rising edge of the third pulse, the output of three-pulses counter 14 turns to "H" and, therefore, the output β of the OR3 turns to "H". Finally, the output of the AND1 becomes "H", and the trip signal γ is outputted.

Figure 4:
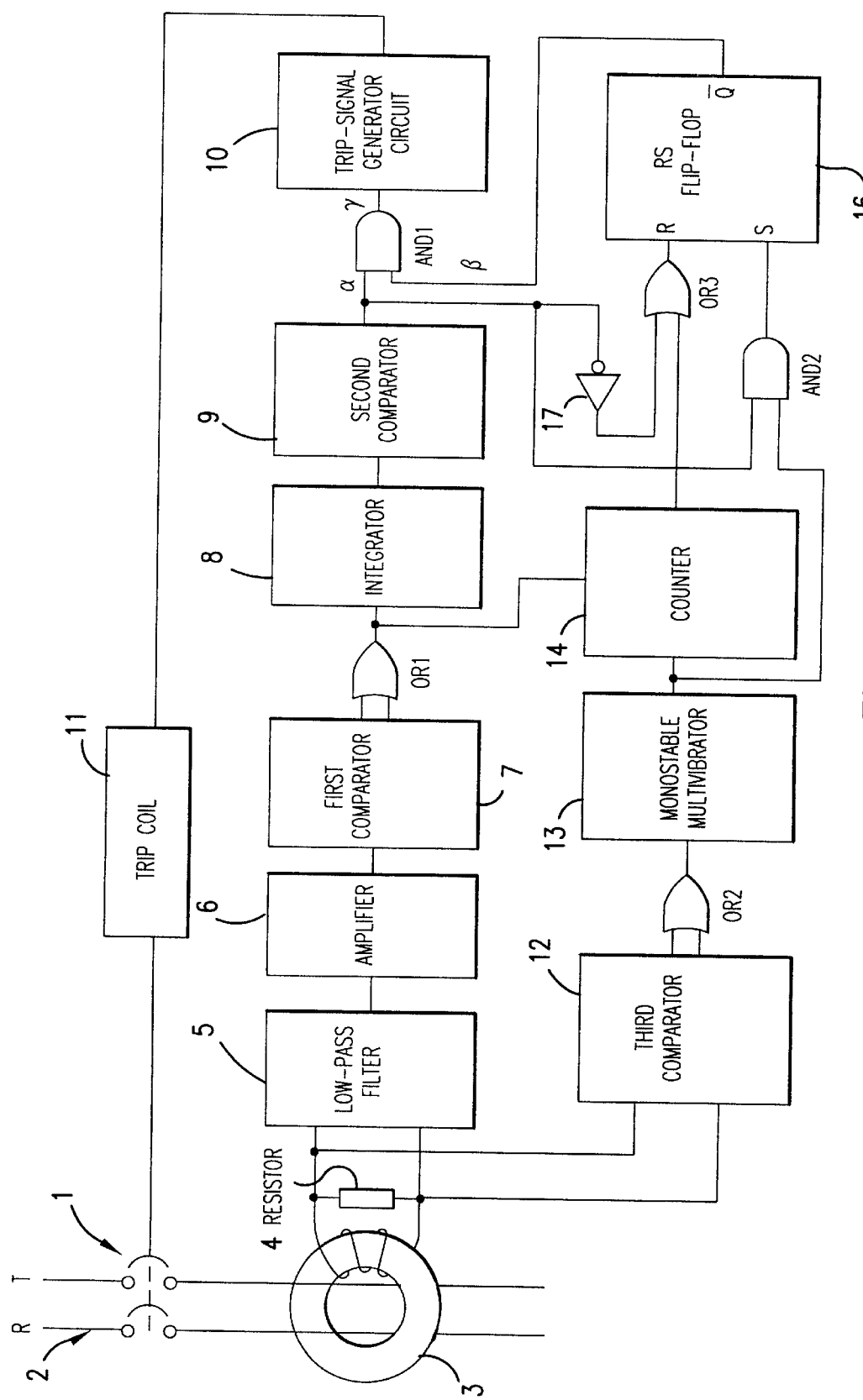
FIG. 4 is a block diagram of a second embodiment of an earth leakage breaker according to the invention.
Figure 5:
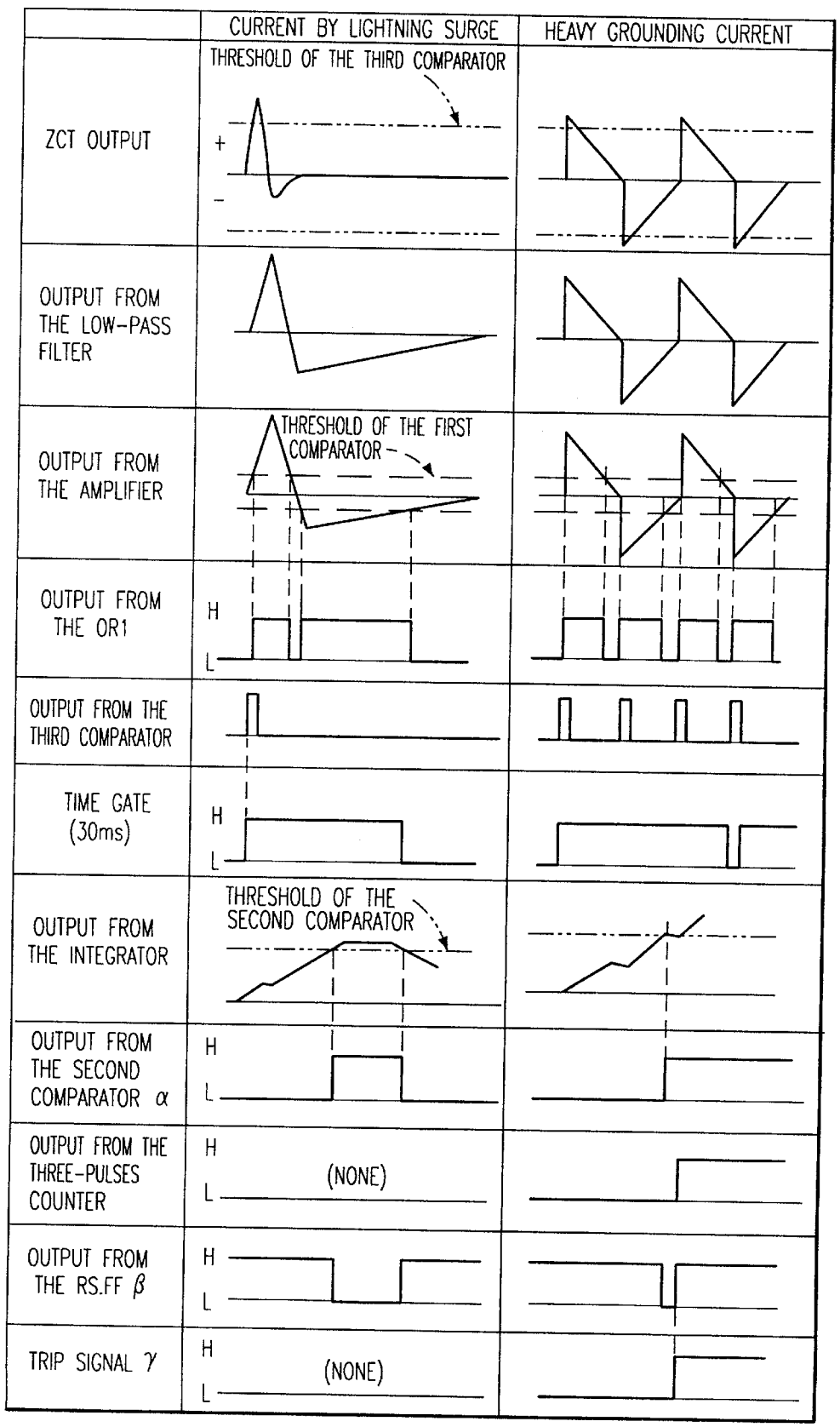
FIG. 5 is a time chart of the outputs from the constituent devices of the earth leakage breaker of FIG. 4.

FIG. 4 is a block diagram of a second embodiment of an earth leakage breaker according to the invention. FIG. 5 is a time chart of the outputs from the constituent devices of the earth leakage breaker of FIG. 4.

Referring now to FIGS. 4 and 5, the output α of the second comparator 9 and the output of the monostable multivibrator 13 are connected to an AND circuit (AND2). The output of the AND2 is connected to the set terminal of an RS flip-flop 16. The inverted output of the second comparator 9 inverted by an inverter 17 and the output of the three-pulses counter 14 are connected to an OR circuit (OR3). The output of the OR3 is connected to the reset terminal of the RS flip-flop 16. The output α of the second comparator 9 and the inverted output β of the RS flip-flop 16 are connected to an AND circuit (AND1). The output of the AND1 is inputted to the trip-signal generator circuit 10.

When a leakage current of 15 mA is caused in the main circuit conductors 2, the output α of the second comparator 9 becomes "H" and the inverted output of the second comparator 9 becomes "L" as described earlier. Since the third comparator 12 does not detect the leakage current as small as 15 mA, the output of the monostable multivibrator 13 stays at "L", and the output of the three-pulses counter 14 is "L". Therefore, the RS flip-flop 16 stays at the reset state and the output β of the RS flip-flop 16 becomes "H". As a result, the output of the AND1 becomes "H", and the trip-signal generator circuit 10 outputs the trip signal γ.

Although the output α of the second comparator 9 and the output of the monostable multivibrator 13 are "H" as described DA earlier when a grounding current is caused by the lightning surge in the main circuit conductors 2, the output of the three-pulses counter stays at "L". Therefore, the RS flip-flop 16 is set, and the inverted output β of the RS flip-flop 16 becomes "L" while the output of the second comparator is "H". As a result, the output of the AND1 becomes "L", and the trip signal γ is not outputted.

When a heavy-grounding current flowing in the main circuit conductors 2 is detected by the third comparator as described earlier, the output of the monostable multivibrator 13 becomes "H". Then, the output of the AND2 becomes "H" at the instance when the output α of the second comparator 9 becomes "H", and the RS flip-flop 16 is set to forbid the output thereof. Afterward, when the output of the three-pulse counter 14 that has counted three pulses inputted from the first comparator 7 becomes "H", the RS flip-flop 16 is reset and the inverted output β of the RS flip-flop 16 becomes "H". As a result, the output of the AND1 becomes "H", and the trip signal γ is outputted.

Figure 6:
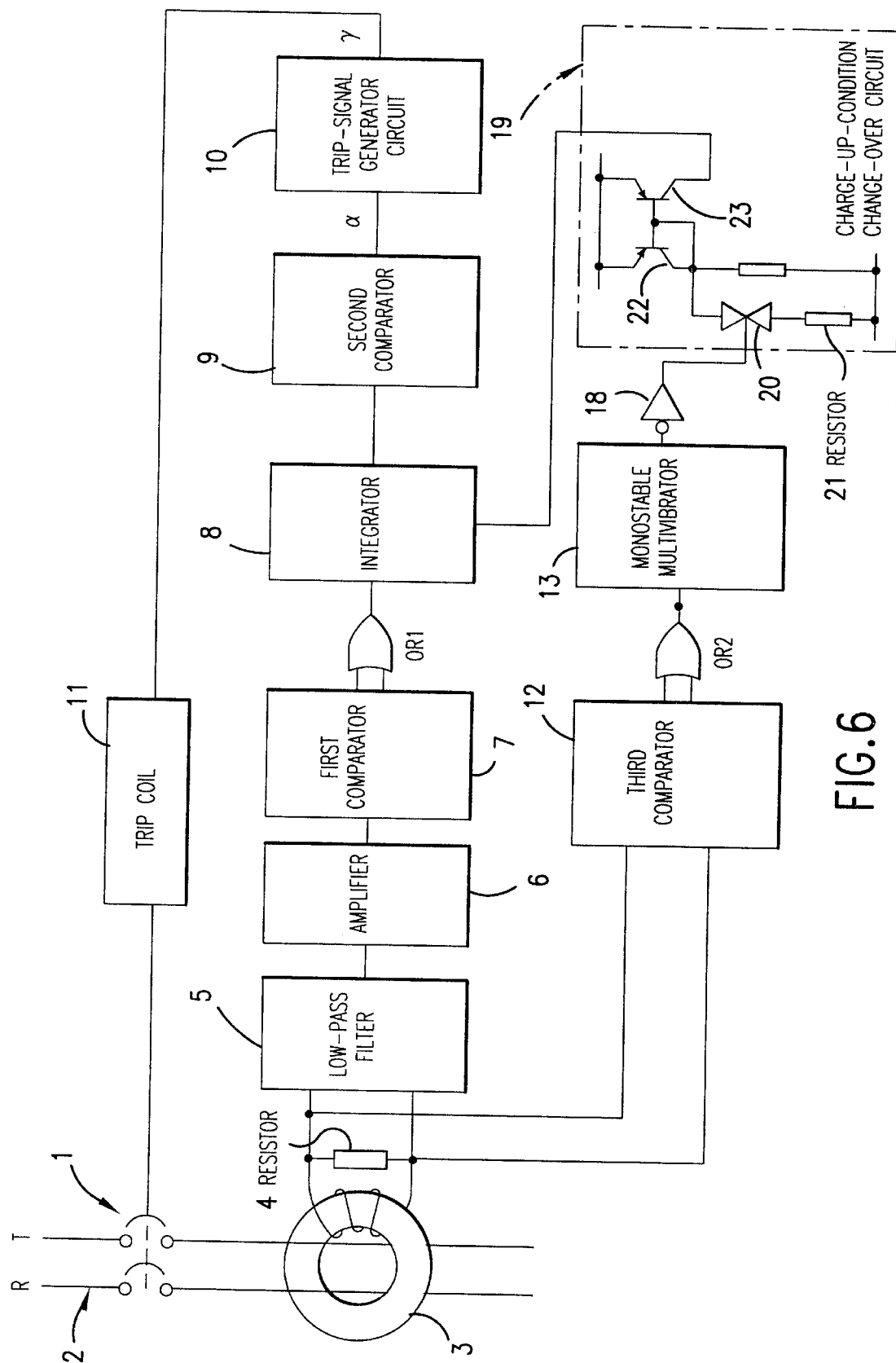
FIG. 6 is a block diagram of a third embodiment of an earth leakage breaker according to the invention.
Figure 7:
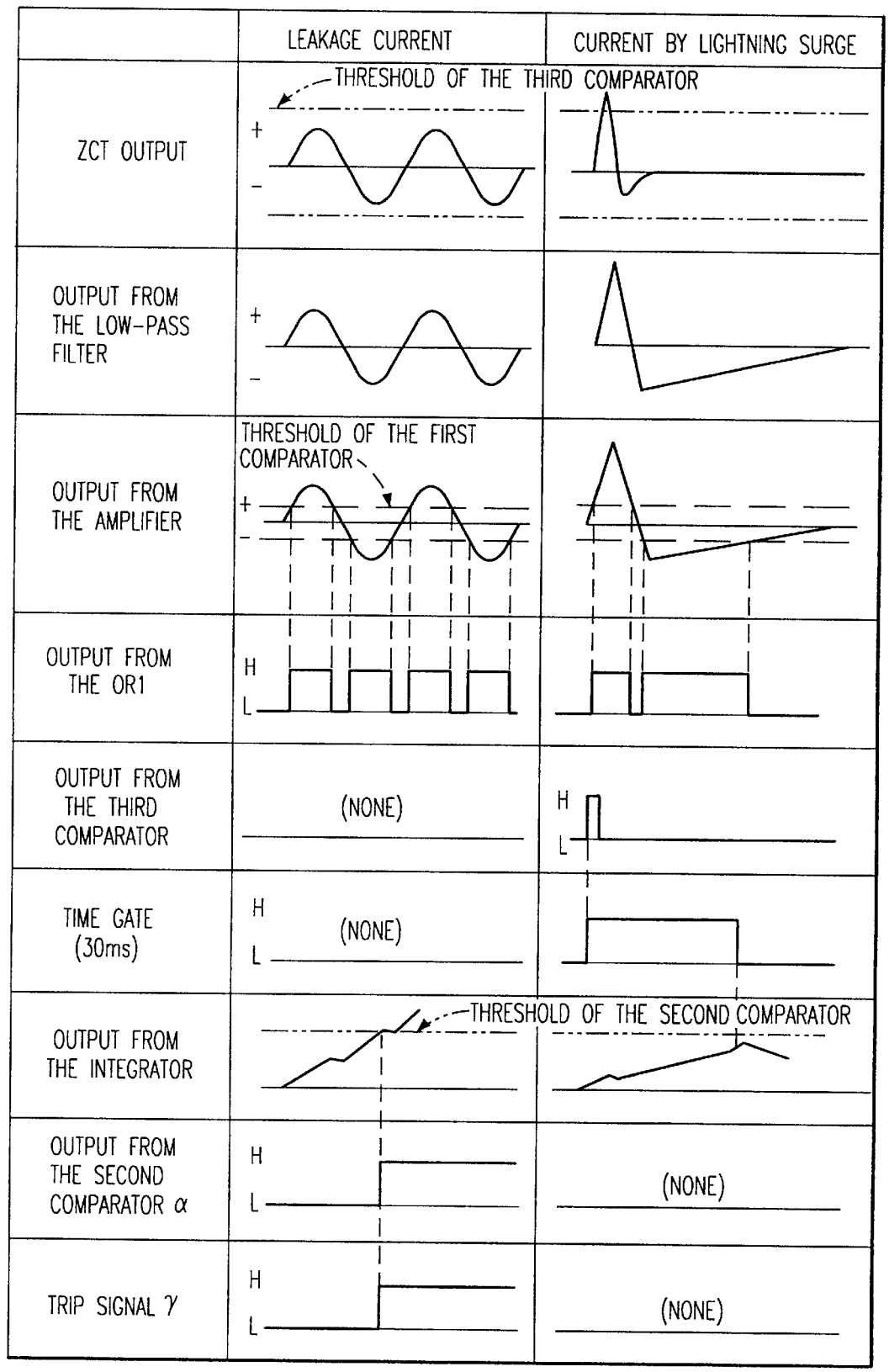
FIG. 7 is a time chart of the outputs from the constituent devices of the earth leakage breaker of FIG. 6.
Figure 8:
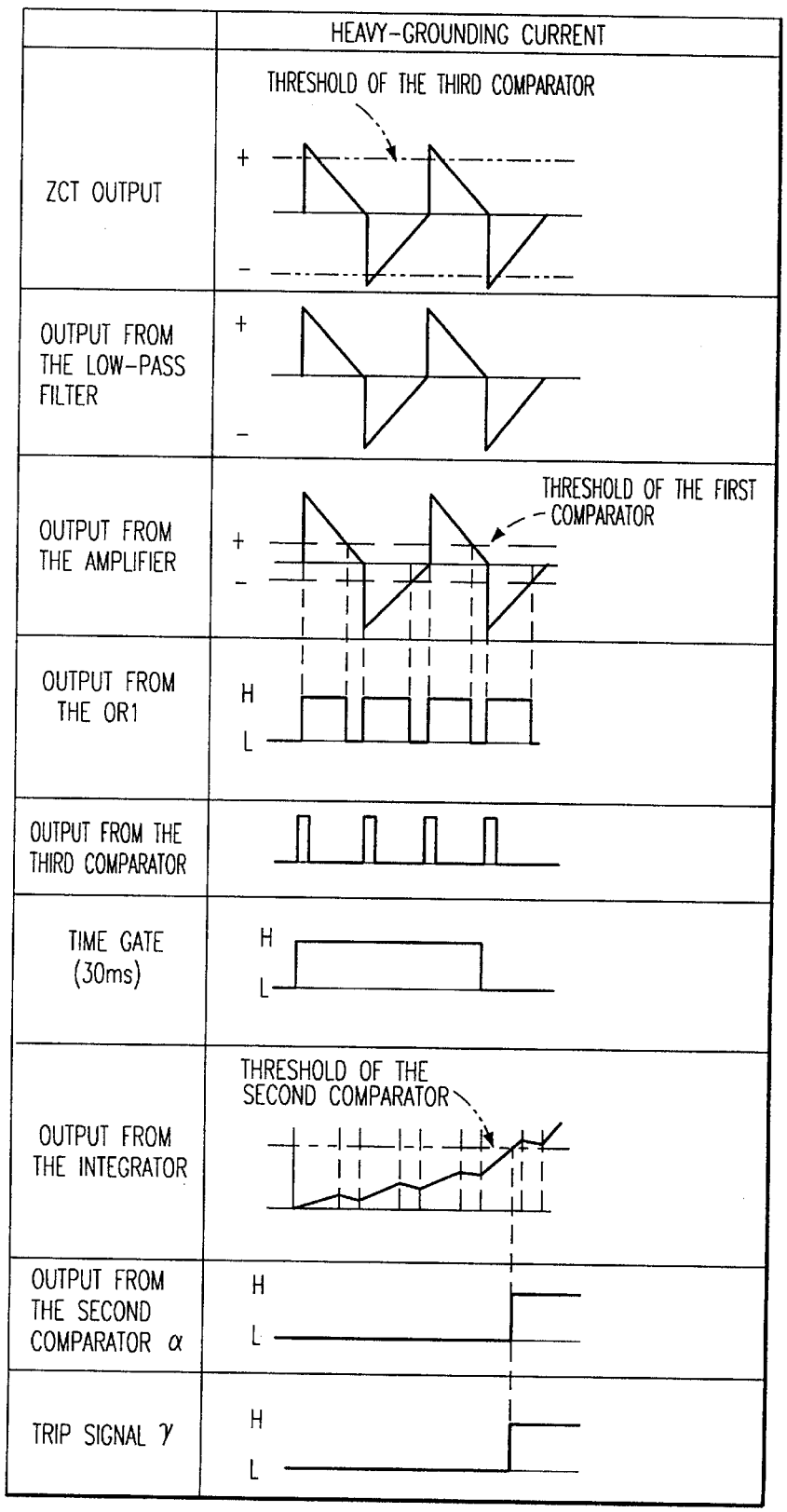
FIG. 8 is another time chart of the outputs from the constituent devices of the earth leakage breaker of FIG. 6.

FIG. 6 is a block diagram of a third embodiment of an earth leakage breaker according to the invention. FIG. 7 is a time chart of the outputs from the constituent devices of the earth leakage breaker of FIG. 6. FIG. 8 is another time chart of the outputs from the constituent devices of the earth leakage breaker of FIG. 6.

Referring now to FIG. 6, the third comparator 12 detects the secondary ZCT current higher than the current detectable by the first comparator 7. The output of the monostable multivibrator 13, triggered by the output of the third comparator 12, is inverted by an inverter 18. The charge-up conditions of a charge-up condition change-over circuit 19 are changed over in response to the output of the inverter 18 to prolong the integration period of the integrator circuit 8 only during the output period of the monostable multivibrator 13.

The change-over circuit 19 has a circuit configuration shown in FIG. 6. The change-over circuit 19 increases the collector current of a transistor 22 by short-circuiting a resistor 21 in the ON state of an analog switch 20. The base current of a transistor 23 is the collector current of the transistor 22. The collector current of the transistor 23, i.e. the current fed to the integrator circuit 8, is increased, and the charge-up of the integrator circuit 8 is completed within the usual integration period thereof. In the OFF state of the analog switch 20, the collector current of the transistor 23 and, therefore, the current fed to the integrator circuit 8 are decreased to prolong the charge-up period of the integrator circuit 8 by limiting the collector current of the transistor 22, i.e. the base current of the transistor 23, with the resistor 21.

Referring also to FIG. 7, the third comparator 12 does not detect a leakage current of the foregoing 15 mA caused in the main circuit conductors 2, and the monostable multivibrator 13 does not start operating. Therefore, the output of the monostable multivibrator 13 becomes "L"; the inverted output thereof becomes "H"; and the analog switch 20 is switched ON. As a result, the output of the integrator circuit 8 exceeds the threshold of the second comparator 9 within the usual integration period of the integrator circuit 8, the output α becomes "H" and the trip signal γ is outputted.

When a grounding current is caused by the lightning surge in the main circuit conductors 2, the output of the third comparator 12 becomes "H" to trigger the operation of the monostable multivibrator 13 and the inverted output of the monostable multivibrator 13 turns to "L". Therefore, the analog switch 20 is switched off to pinch the charge-up current during the output period of the monostable multivibrator 13, and the integration period of the integrator circuit 8 is prolonged. As a result, the first comparator 7 stops the output generation thereof before the output of the integrator circuit 8 reaches the threshold of the second comparator 9 as described in FIG. 7. Finally, the trip signal γ is not outputted, since the output α of the second comparator 9 stays at "L".

When the third comparator 12 detects a heavy-grounding current caused in the main circuit conductors 2, the output of the monostable multivibrator 13 becomes "H" as described in FIG. 8 and the integration period of the integrator circuit 8 is prolonged during the output period of the monostable multivibrator 13. Due to this, the period until the output of the integrator circuit 8 reaches the threshold of the second comparator 9 is prolonged. However, since the first comparator 7 keeps generating the output thereof, the output of the integrator circuit 8 finally exceeds the threshold of the second comparator 9. Thus, the output α of the second comparator 9 becomes "H" and the trip signal γ is outputted.

Figure 9:
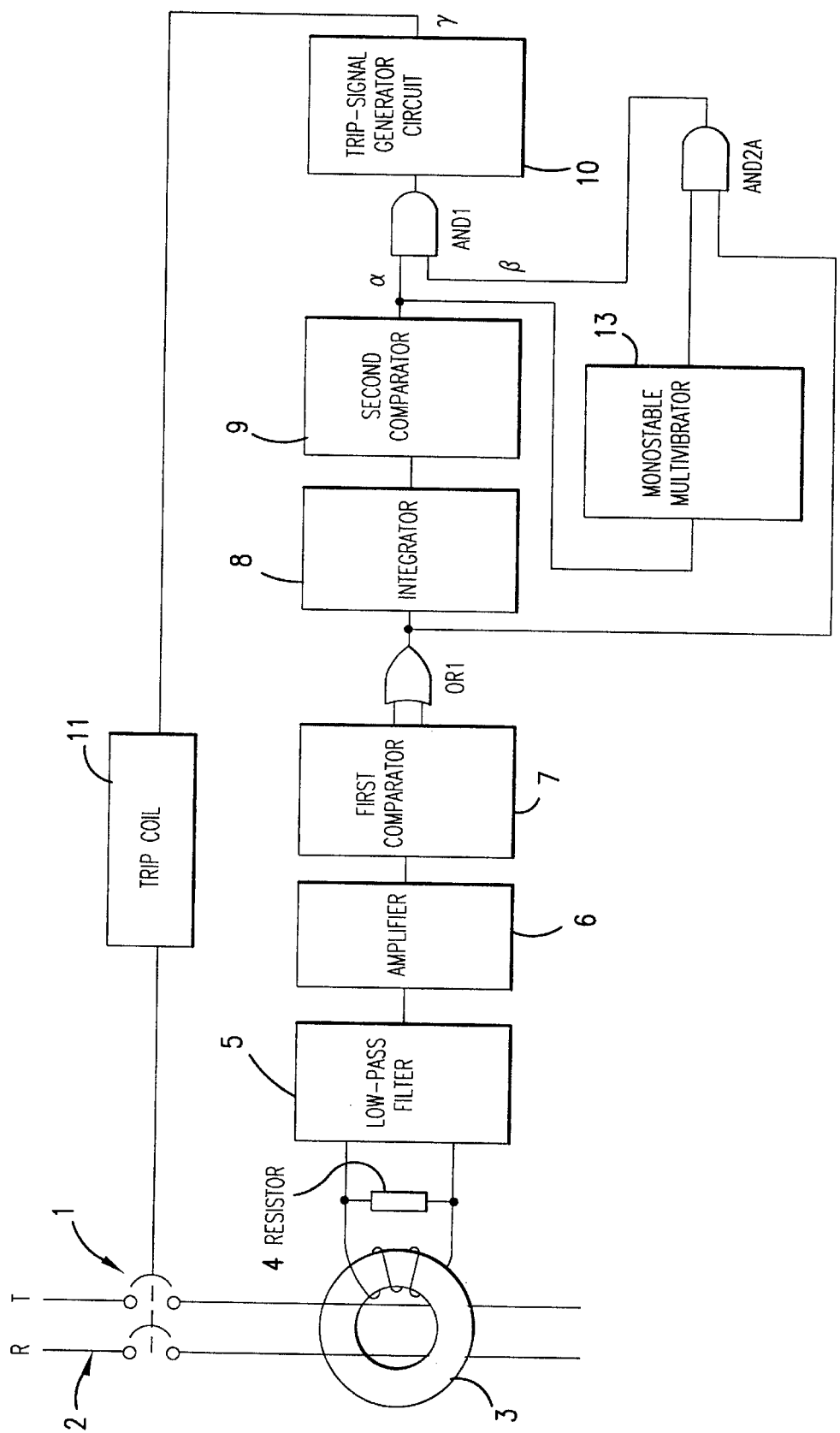
FIG. 9 is a block diagram of a fourth embodiment of an earth leakage breaker according to the invention.
Figure 10:
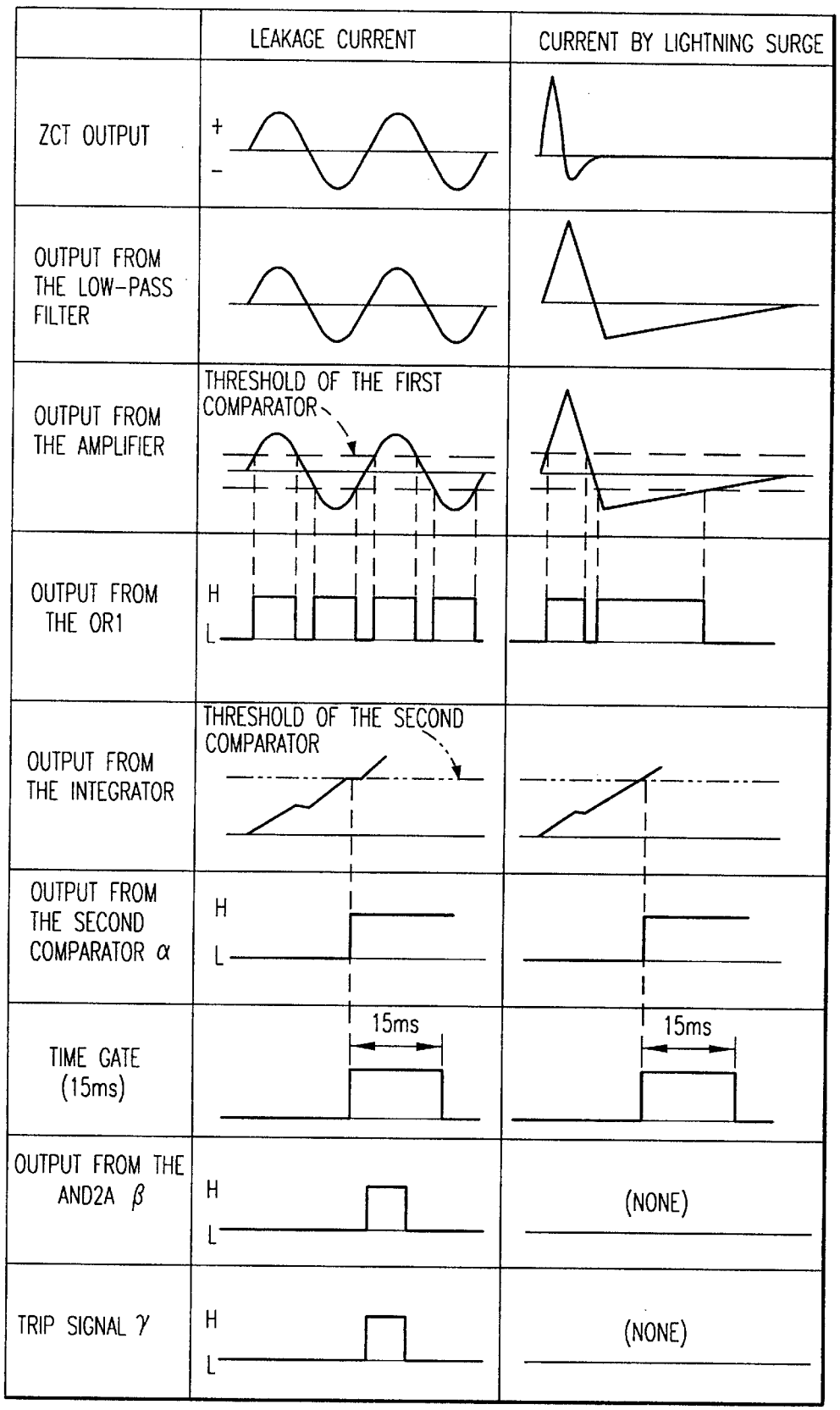
FIG. 10 is a time chart of the outputs from the constituent devices of the earth leakage breaker of FIG. 9.
Figure 11:
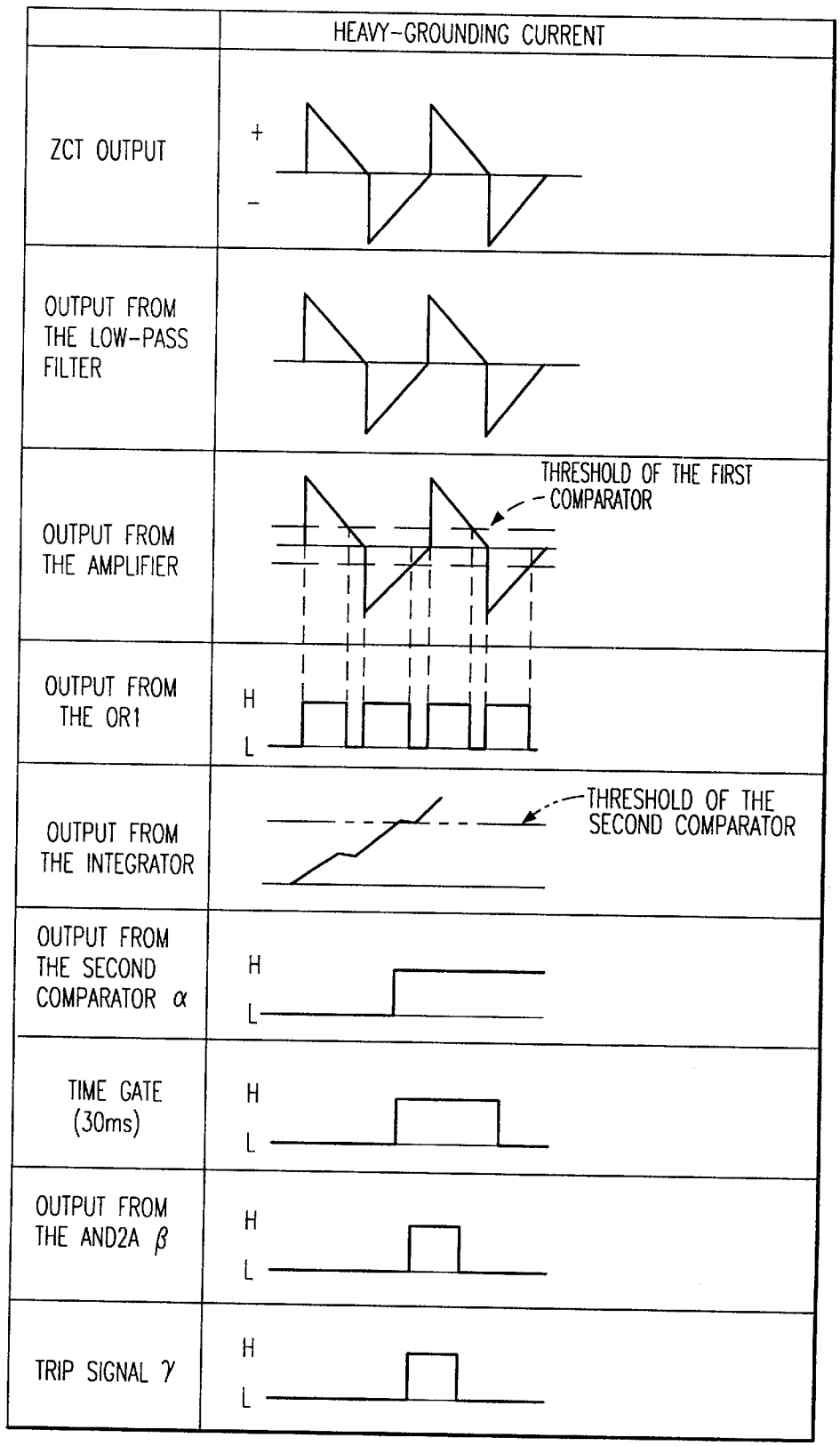
FIG. 11 is another time chart of the outputs from the constituent devices of the earth leakage breaker of FIG. 9.

FIG. 9 is a block diagram of a fourth embodiment of an earth leakage breaker according to the invention. FIG. 10 is a time chart of the outputs from the constituent devices of the earth leakage breaker of FIG. 9. FIG. 11 is another time chart of the outputs from the constituent devices of the earth leakage breaker of FIG. 9.

Referring now to FIG. 9, the output of the monostable multivibrator 13 triggered by the output α of the second comparator 9 and the output of the first comparator 7 are connected to an AND circuit (AND2A). The AND output of the output β from the AND2A and the output α from the second comparator 9 is connected to the trip signal generator circuit 10. The AND2A is designed to generate the output when a signal indicating a change from "L" to "H" is inputted thereto from the first comparator 7 during a period that a signal from the monostable multivibrator 13 exists.

Referring also to FIG. 10, when a leakage current flows in the main circuit conductors 2, the output α of the second comparator 9 becomes "H", by which the monostable multivibrator 13 is triggered to form a time gate of, e.g., 15 ms. Then, the output β of the AND2A turns to "H" at the instance when the output of the first comparator 7 rises. Therefore, the output of the AND1 becomes "H" and the trip signal γ is outputted.

Even when a grounding current flow is caused by the lightning surge in the main circuit conductors 2 and the monostable multivibrator 13 is triggered to operate by the "H" output α of the second comparator 9, the trip signal γ is not outputted, since output of the AND2A stays at "L" due to the non-existence of the rising signal output from the first comparator 7 as shown in FIG. 10.

Referring also to FIG. 11, since the first comparator 7 generates the output thereof after the monostable multivibrator 13 starts operating, the output β of the AND2A becomes "H". Therefore, the output of the AND1 becomes "H", and the trip signal γ is outputted.

Figure 12:
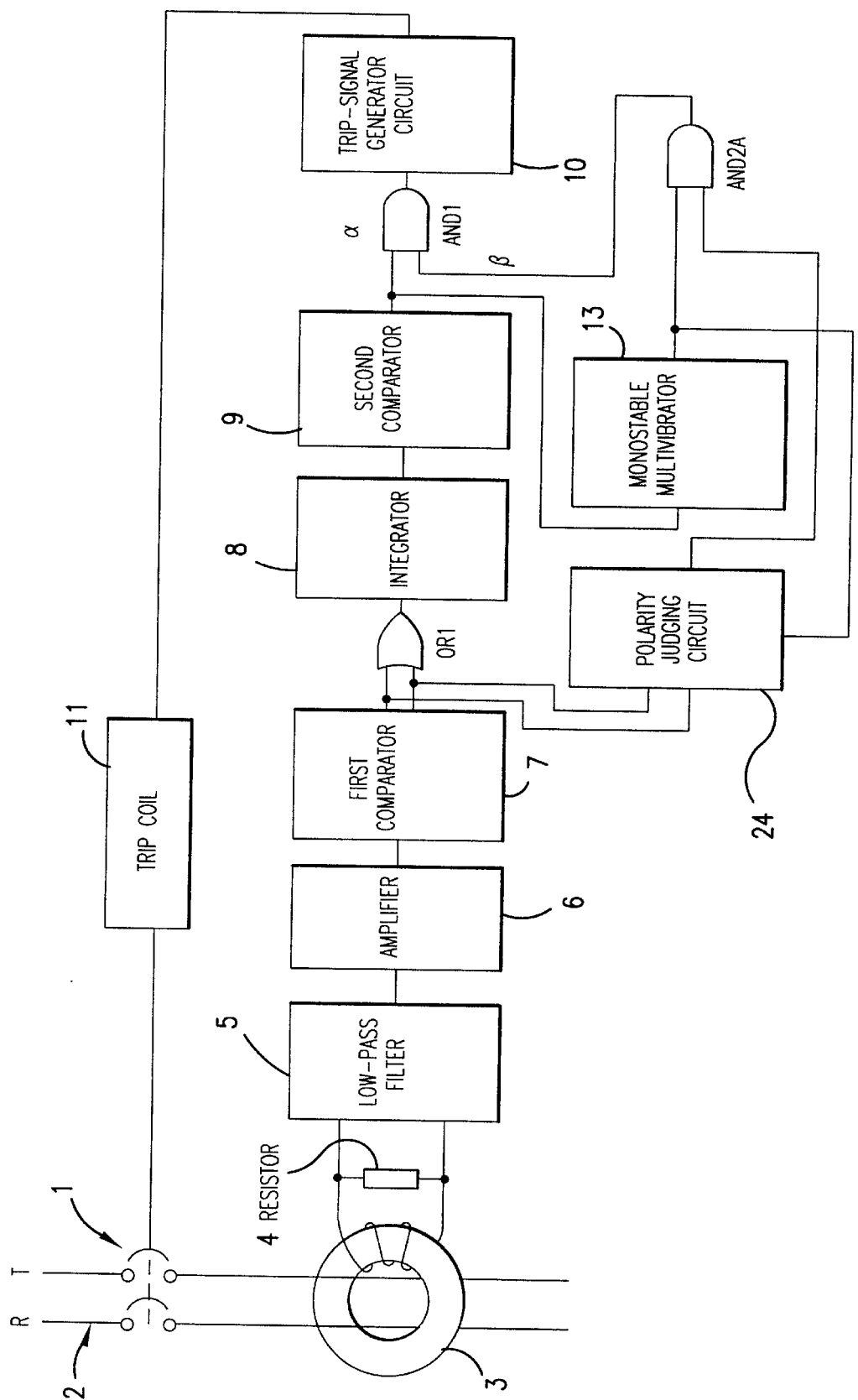
FIG. 12 is a block diagram of a fifth embodiment of an earth leakage breaker according to the invention.
Figure 13:
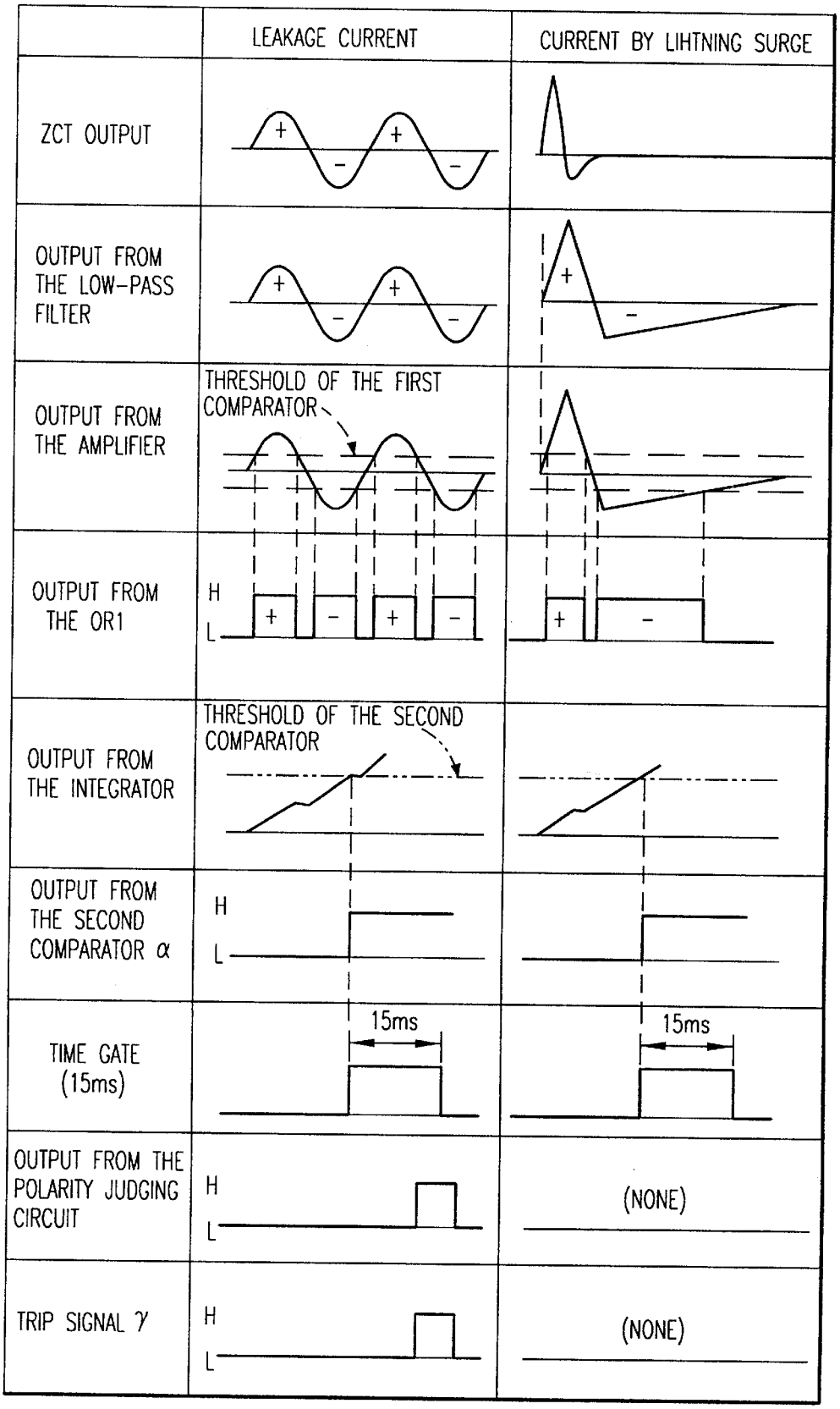
FIG. 13 is a time chart of the outputs from the constituent devices of the earth leakage breaker of FIG. 12.

FIG. 12 is a block diagram of a fifth embodiment of an earth leakage breaker according to the invention. FIG. 13 is a time chart of the outputs from the constituent devices of the earth leakage breaker of FIG. 12. Referring now to FIG. 12, the monostable multivibrator 13 is triggered to operate by "H" output α of the second comparator 9. During the "H" output, a polarity judging circuit 24 judges whether the first comparator 7 outputs alternating positive and negative pulses or not. The output of the polarity judging circuit 24 and the output of the monostable multivibrator 13 are connected to the AND circuit (AND2A). The AND output of the output β from the AND2A and the output α from the second comparator 9 are inputted to the trip signal generator circuit 10.

Referring also to FIG. 13, when the output α of the second comparator 9 is turned to "H" and the monostable multivibrator 13 is triggered to operate due to a leakage current flowing in the main circuit conductors 2, the output of the polarity judging circuit 24 becomes "H" at the instance when the first comparator 7 outputs an alternating positive and negative output. Then, the output α of the AND2A becomes "H" and the trip signal γ is outputted.

Even when a grounding current is caused by the lightning surge in the main circuit conductors 2 and the monostable multivibrator 13 is triggered to operate by the "H" output α of the second comparator 9, the output of the polarity judging circuit 24 does not become "H", since the output of the first comparator 7 keeps the negative polarity as shown in FIG. 13. Since the output β of the AND2A stays at "L", the trip signal γ is not outputted.

Although the time chart is not shown, the trip signal γ is outputted when a repetitive continuous heavy ground fault is caused, since the alternating positive and negative outputs are inputted from the first comparator 7 to the polarity judging circuit 24 after the monostable multivibrator 13 starts operating.

Figure 14:
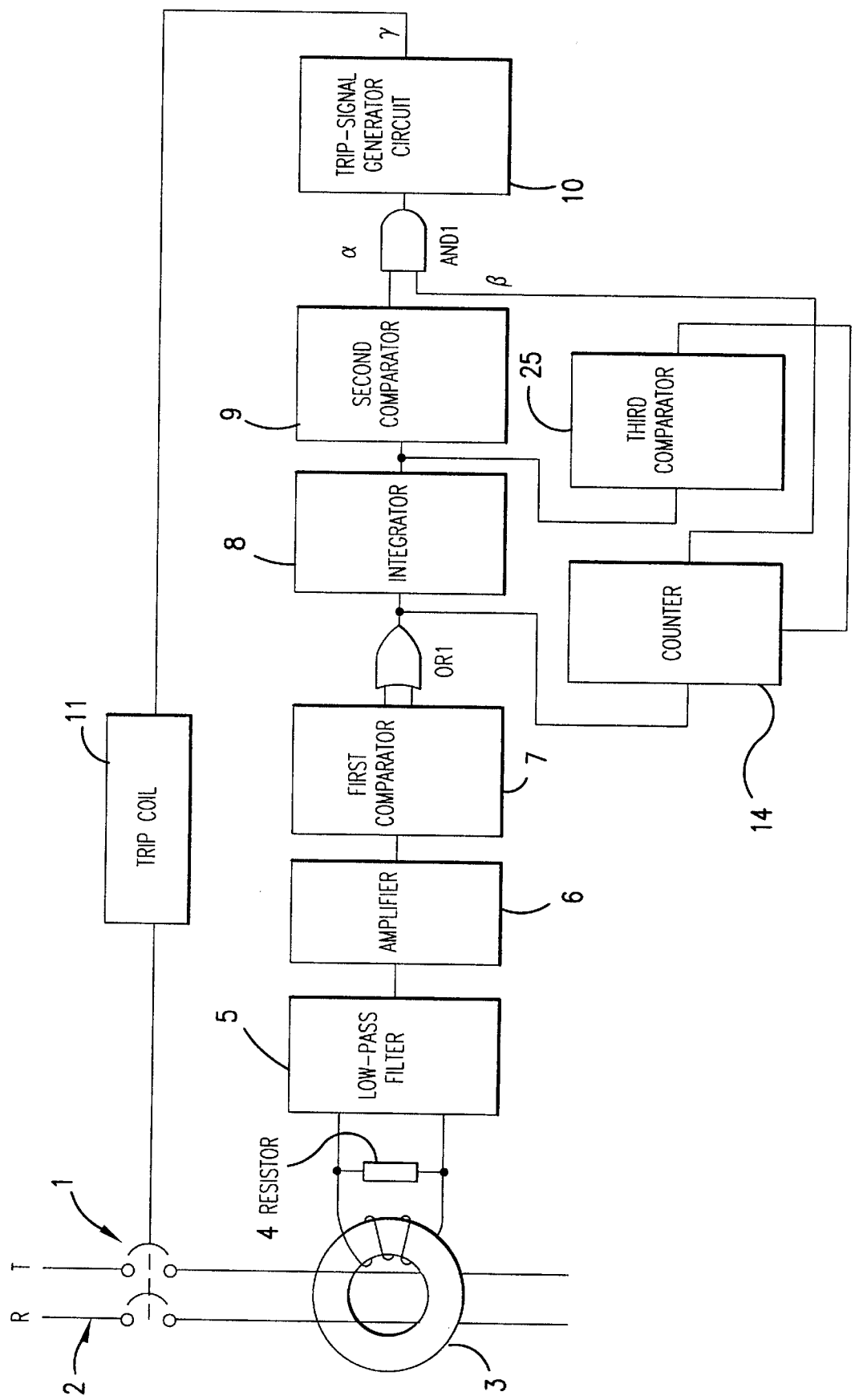
FIG. 14 is a block diagram of a sixth embodiment of an earth leakage breaker according to the invention.
Figure 15:
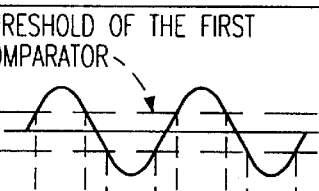
FIG. 15 is a time chart of the outputs from the constituent devices of the earth leakage breaker of FIG. 14.
Figure 16:
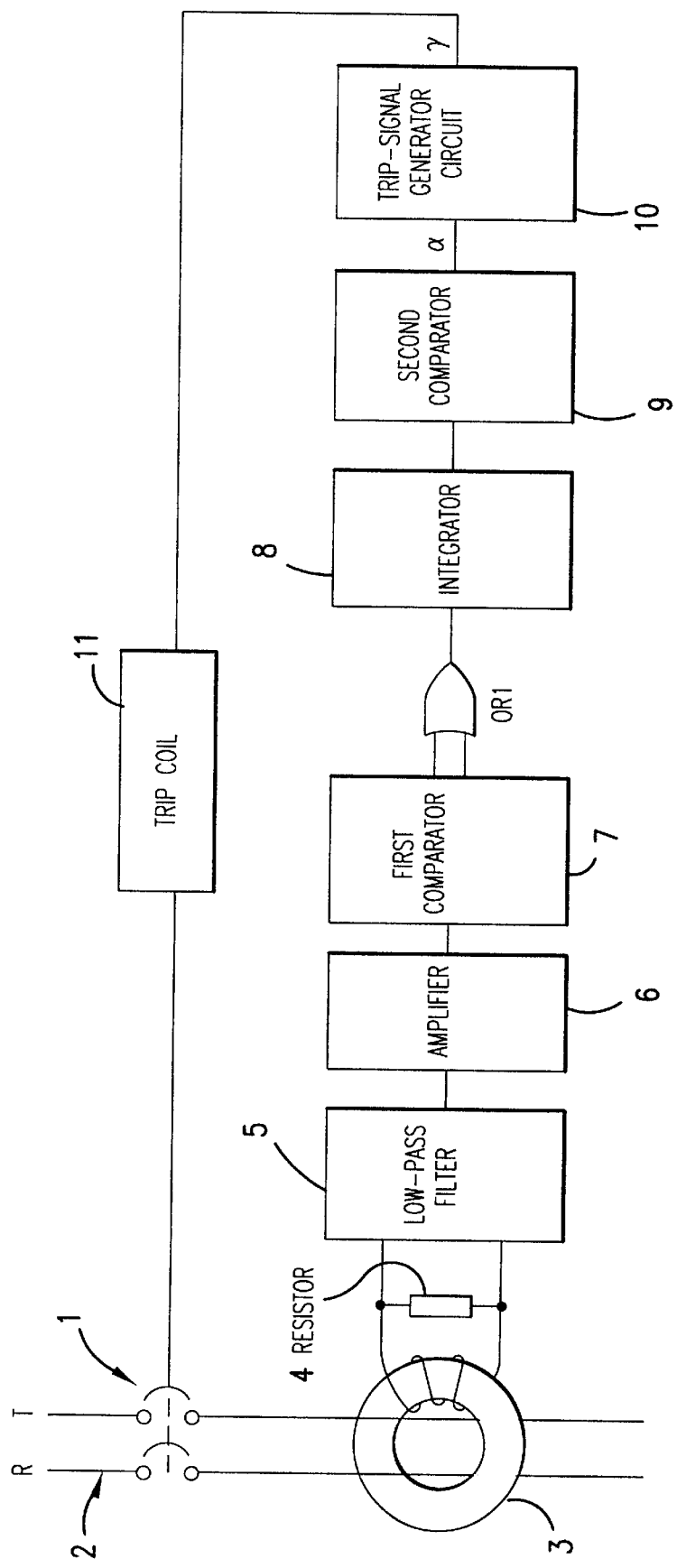
FIG. 16 is a block diagram of a conventional earth leakage breaker.
Figure 17:
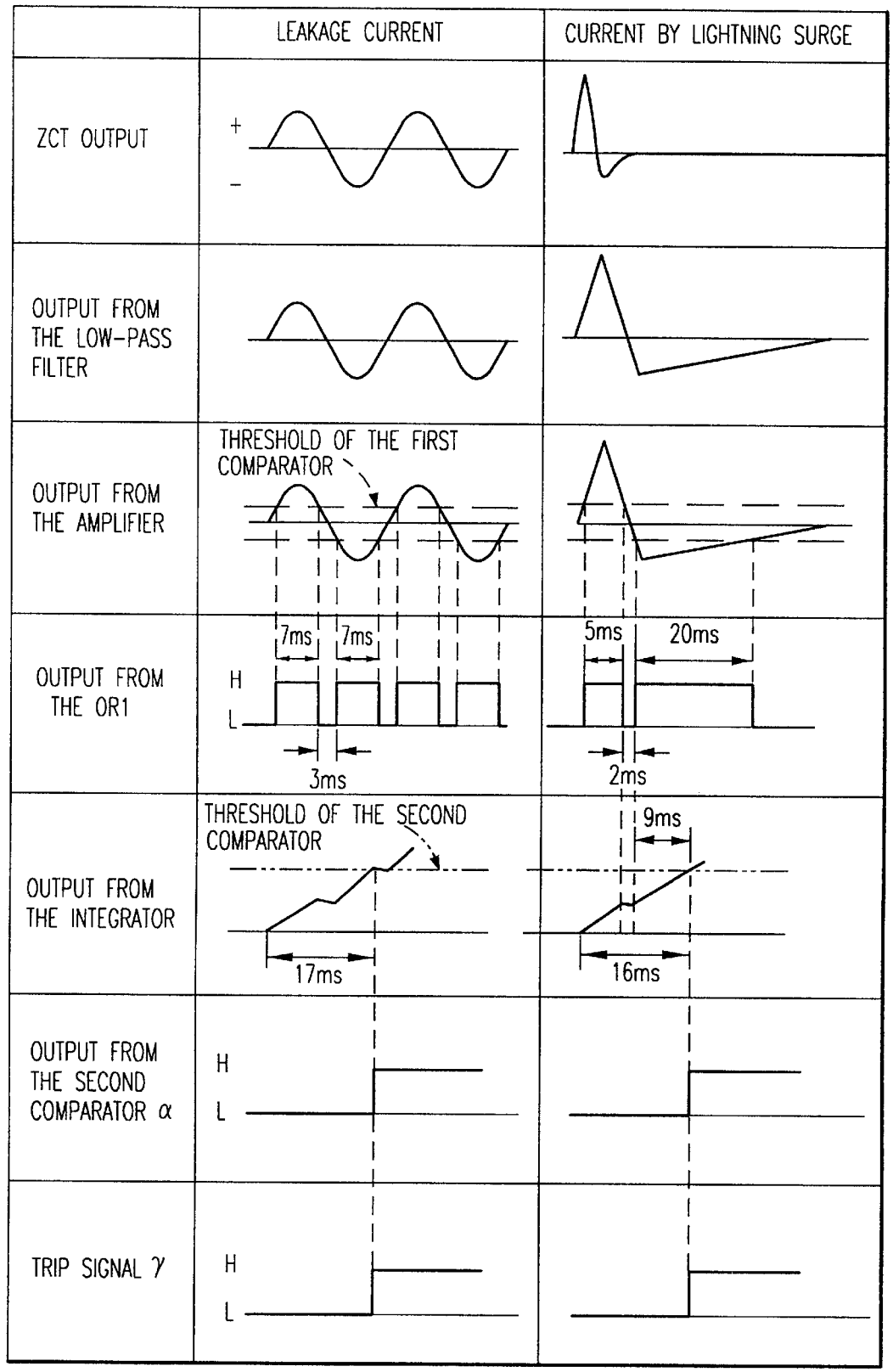
FIG. 17 is a time chart of the outputs from the constituent devices of the conventional earth leakage breaker of FIG. 16.

FIG. 14 is a block diagram of a sixth embodiment of an earth leakage breaker according to the invention. FIG. 15 is a time chart of the outputs from the constituent devices of the earth leakage breaker of FIG. 14. Referring now to FIG. 14, a third comparator 25 detects the output of the integrator circuit 8, which is smaller than the output detectable by the second comparator 9. The three-pulses counter 14 counts the pulses outputted from the first comparator 7 in response to the output of the fourth comparator 25. The AND output of the output β from the three-pulses counter 14 and the output α from the second comparator 9 is inputted to the trip signal generator circuit 10.

Referring also to FIG. 15, the integrator circuit 8 starts outputting when a leakage current flows in the main circuit conductors 2 and the output of the amplifier 6 exceeds the threshold of the first comparator 7. When the output of the integrator circuit 8 exceeds the threshold of the fourth comparator 25, the three-pulses counter 14 starts counting the output pulses of the first comparator 7. The output β of the three-pulses counter 14 becomes "H" at the instance when the rising of the third pulse is inputted to the three-pulses counter 14. Since the output α of the second comparator 9 is already "H" at that instance, the output of the AND1 becomes "H" and the trip signal γ is outputted.

Even when a grounding current is caused by the lightning surge in the main circuit conductors 2 and the three-pulses counter 14 starts counting the output pulses of the first comparator 7 in response to the "H" output of the fourth comparator 25, the output β of the three-pulses counter 14 stays at "L", since only the first pulse is inputted to the three-pulses counter 14. Therefore, the trip signal γ is not outputted.

Although the time chart is not shown, the trip signal γ is outputted when a repetitive continuous heavy ground fault is caused, since it is possible for the three-pulses counter 14 to count three pulses.

As explained above, the earth leakage breaker of the invention facilitates breaking a leakage current within 40 ms as specified by the IEC specification and a repetitive and continuous heavy-grounding current. The earth leakage breaker of the invention also facilitates avoiding unnecessary breaking of the impulsive grounding current caused by the lightning surge.

What is claimed is:

1. An earth leakage breaker having main circuit conductors comprising:

a zero-phase current transformer through which the main circuit conductors are inserted;

first detecting means for detecting a leakage current and a grounding current including heavy ground fault and lightning surge, said first detecting means comprising a first comparator connected to the zero-phase current transformer for detecting if a secondary output of the zero-phase current transformer exceeds a first detection level; an integrator connected to the first comparator for integrating an output of the first comparator; and a second comparator connected to the integrator, said second comparator detecting an output of the integrator exceeding a second detection level and out putting a first signal;

second detecting means connected parallel to the first detecting means and having a third detection level higher than said first detection level, said second detecting means detecting if said secondary output of said zero-phase current transformer repeatedly exceeds said third detection level to thereby output a second signal indicative of one of said leakage current and said grounding current caused by heavy ground fault, said second detecting means including a third comparator connected to the zero-phase current transformer for detecting if said secondary output of said zero-phase current transformer is higher than said third detection level; a monostable multivibrator connected to the third comparator to be triggered by an output of the third comparator for a predetermined operating period; a counter connected to the monostable multivibrator and the first comparator, said counter counting pulses outputted from said first comparator for said predetermined operating period of said monostable multivibrator and outputting a counting signal indicating that said counter has counted a predetermined number of pulses; and an OR gate connected to the counter and the monostable multivibrator, said OR gate receiving-said-counting signal and an inverted output from said monostable multivibrator and outputting the second signal;

a first AND gate connected to the first and second detecting means, said first AND gate receiving said second signal from said second detecting means and said first signal from said second comparator and outputting an AND output; and a trip signal generator connected to the first and second detecting means through the first AND gate, said trip signal generator outputting a trip signal to a trip coil in response to said first signal and said second signal.

2. An earth leakage breaker having main circuit conductors comprising:

a zero-phase current transformer through which the main circuit conductors are inserted;

first detecting means for detecting a leakage current and a grounding current including heavy ground fault and lightning surge, said first detecting means comprising a first comparator connected to the zero-phase current transformer for detecting if a secondary output of the zero-phase current transformer exceeds a first detection level; an integrator connected to the first comparator for integrating an output of the first comparator; and a second comparator connected to the integrator, said second comparator detecting an output of the integrator exceeding a second detection level and outputting a first signal;

second detecting means arranged parallel to said integrator and said second comparator of said first detecting means, said second detecting means detecting a predetermined number of pulses outputted from said first comparator in a period based on said first signal from said second comparator, and outputting a second signal indicative of one of said leakage current and said grounding current caused by heavy ground fault; and a trip signal generator connected to the first and second detecting means, said trip signal generator outputting a trip signal to a trip coil in response to said first signal and said second signal.

3. The earth leakage breaker according to claim 2, further comprising a first AND gate connected to the first and second detecting means, said first AND gate receiving said second signal from said second detecting means and said first signal from said second comparator and outputting an AND output to said trip signal generator.

4. The earth leakage breaker according to claim 3, wherein said second detecting means comprises:

a monostable multivibrator connected to the second comparator to be triggered by said first signal from said second comparator; for a predetermined operating period and a second AND gate connected to an output of said monostable multivibrator and the output of said first comparator, an AND output of said second AND gate being said second signal and being outputted when an output from said monostable multivibrator and a new output from said first comparator are inputted.

5. The earth leakage breaker according to claim 3, wherein said second detecting means comprises:

a monostable multivibrator connected to the second comparator to be triggered by said first signal from said second comparator for a predetermined operating period;

a polarity judging circuit connected to the first comparator and the monostable multivibrator, said polarity judging circuit judging alternating input of positive and negative pulses from said first comparator for said predetermined operating period of said monostable multivibrator; and a second AND gate connected to the monostable multivibrator and the polarity judging circuit, an output of said second AND gate being said second signal and being outputted when an output from said monostable multivibrator and a new output from said polarity judging circuit are inputted.

6. An earth leakage breaker having main circuit conductors comprising:

a zero-phase current transformer through which the main circuit conductors are inserted;

first detecting means for detecting a leakage current and a grounding current including heavy around fault and lightning surge, said first detecting means comprising a first comparator connected to the zero-phase current transformer for detecting if a secondary output of the zero-phase current transformer exceeds a first detection level; an integrator connected to the first comparator for integrating an output of the first comparator; and a second comparator connected to the integrator, said second comparator detecting an output of the integrator exceeding a second detection level and outputting a first signal;

second detecting means arranged parallel to said integrator of said first detecting means, said second detecting means detecting a predetermined number of pulses outputted from said first comparator, and outputting a second signal indicative of one of said leakage current and said grounding current caused by heavy around fault;

a trip signal generator connected to the first and second detecting means, said trip signal generator outputting a trip signal to a trip coil in response to said first signal and said second signal;

said second detecting means comprises a third comparator connected to the integrator for detecting an output of said integrator smaller than said second detection level; and a counter connected to the first comparator to be triggered by an output of the third comparator to count a predetermined number of pulses outputted from said first comparator, said counter outputting a counting signal indicating said counter has counted the predetermined number of pulses, said counting signal being said second signal.

7. An earth leakage breaker having main circuit conductors comprising:

a zero-phase current transformer through which the main circuit conductors are inserted;

first detecting means for detecting a leakage current and a grounding current including heavy ground fault and lightning surge, said first detecting means comprising a first comparator connected to the zero-phase current transformer for detecting if a secondary output of the zero-phase current transformer exceeds a first detection level; an integrator connected to the first comparator for integrating an output of the first comparator; and a second comparator connected to the integrator, said second comparator detecting an output of the integrator exceeding a second detection level and outputting a first signal;

second detecting means connected parallel to the first detecting means and having a third detection level higher than said first detection level, said second detecting means detecting if said secondary output of said zero-phase current transformer repeatedly exceeds said third detection level to thereby output a second signal indicative of one of said leakage current and said grounding current caused by heavy ground fault, said second detecting means including a third comparator connected to the zero-phase current transformer for detecting if the secondary output of said zero-phase current transformer is higher than said third detection level; a monostable multivibrator connected to the third comparator to be triggered by an output of the third comparator for a predetermined operating period; a counter connected to the monostable multivibrator and the first comparator, said counter counting pulses outputted from said first comparator for said predetermined operating period of said monostable multivibrator and outputting a counting signal indicating that said counter has counted a predetermined number of pulses; and an RS flip-flop having a reset terminal for receiving an OR output by said counting signal and an inverted output of said first signal from said second comparator, and a set terminal for receiving an AND output by an output from said monostable multivibrator and said first signal from said second comparator, an inverted output of said RS flip-flop being said second signal;

a first AND gate connected to the first and second detecting means, said first AND gate receiving said second signal from said second detecting means and said first signal from said second comparator and outputting an AND output; and a trip signal generator connected to the first and second detecting means through the first AND gate, said trip signal generator outputting a trip signal to a trip coil in response to said first signal and said second signal.

8. An earth leakage breaker having main circuit conductors comprising:

a zero-phase current transformer through which the main circuit conductors are inserted;

first detecting means for detecting a leakage current and a grounding current including heavy ground fault and lightning surge, said first detecting means comprising a first comparator connected to the zero-phase current transformer for detecting if a secondary output of the zero-phase current transformer exceeds a first detection level; an integrator connected to the first comparator for integrating an output of the first comparator; and a second comparator connected to the integrator, said second comparator detecting an output of the integrator exceeding a second detection level and outputting a first signal;

second detecting means connected parallel to the first comparator of the first detecting means and having a third detection level higher than said first detection level, said second detecting means detecting if said secondary output of said zero-phase current transformer repeatedly exceeds said third detection level to thereby output a second signal indicative of one of said leakage current and said grounding current caused by heavy ground fault, said second detecting means including a third comparator connected to the zero-phase current transformer for detecting if the secondary output of said zero-phase current transformer is higher than said third detection level; a monostable multivibrator connected to the third comparator to be triggered by an output of the third comparator for a predetermined operating period; and a charge-up condition change-over circuit connected to the monostable multivibrator for changing over a charge-up condition of said integrator to thereby prolong an integration period of the integrator for said predetermined operating period of said monostable multivibrator; and a trip signal generator connected to the second comparator of the first detecting means, said trip signal generator outputting a trip signal to a trip coil in response to said first signal and said second signal.

9. The earth leakage breaker according to claim 8, wherein said charge-up condition change-over circuit is connected to the integrator to control an output time of the integrator.

* * * * *

UNITED STATES PATENT AND TRADEMARK OFFICE
CERTIFICATE OF CORRECTION

PATENT NO. : 5,856,902
DATED : January 5, 1999
INVENTOR(S) : Takashi Hashimoto, Kiyoshi Tanigawa, Shoji Sasaki, Katsumi Watanabe It is certified that error appears in the above-identified patent and that said Letters Patent is hereby corrected as shown below:

In column 2, line 30, delete a period after "are";
            line 62, change "is" to --are--;

In column 4, line 43, change "fourth" to --third--;
            line 46, change "fourth" to --third--;

In column 6, line 24, change "a" to --$\alpha$--;
            line 35, change "a and B" to --$\alpha$ and $\beta$--;

In column 10, line 4, change "fourth" to --third--;
             line 12, change "fourth" to --third--;
             line 23, change "fourth" to --third--;

In column 11, line 12, change "receiving-said-" to --receiving said--;
             line 64, delete semicolon;
             line 65, after "period" add semicolon;

In column 12, line 28, change "around" to --ground; and
             line 44, change "around" to --ground--.

Signed and Sealed this

Fifteenth Day of June, 1999

Attest:

Attesting Officer

Q. TODD DICKINSON

Acting Commissioner of Patents and Trademarks